US008229591B2

(12) United States Patent
Betsche

(10) Patent No.: US 8,229,591 B2
(45) Date of Patent: Jul. 24, 2012

(54) METHOD FOR SEQUENCE PROGRAMMING OF AN INJECTION MOLDING CYCLE OF AN INJECTION MOLDING MACHINE

(75) Inventor: Markus Betsche, Rosenheim (DE)

(73) Assignee: KraussMaffei Technologies GmbH, München (DE)

( * ) Notice: Subject to any disclaimer, the term of this patent is extended or adjusted under 35 U.S.C. 154(b) by 367 days.

(21) Appl. No.: 12/470,908

(22) Filed: May 22, 2009

(65) Prior Publication Data

US 2009/0319067 A1  Dec. 24, 2009

Related U.S. Application Data

(63) Continuation of application No. PCT/EP2007/062230, filed on Nov. 12, 2007.

(30) Foreign Application Priority Data

Nov. 23, 2006 (DE) .......................... 10 2006 055 330

(51) Int. Cl.
*G06F 19/00* (2011.01)
(52) U.S. Cl. .......................................... 700/200; 700/23
(58) Field of Classification Search .................... 700/18, 700/23, 28, 47, 86, 118, 200–201, 181, 197–198; 264/40.1, 37, 297.1; 425/145, 557
See application file for complete search history.

(56) References Cited

U.S. PATENT DOCUMENTS

| 4,224,501 A | 9/1980 | Lindbom et al. |
| 4,696,632 A | 9/1987 | Inaba |
| 5,028,365 A * | 7/1991 | Neko et al. .................... 264/40.1 |
| 5,550,744 A | 8/1996 | Steinbichler |
| 6,108,587 A * | 8/2000 | Shearer et al. ................. 700/200 |
| 6,381,512 B1 * | 4/2002 | Saitou et al. ................... 700/200 |
| 7,010,368 B2 * | 3/2006 | Otani et al. ...................... 700/86 |
| 2003/0090018 A1 * | 5/2003 | Bulgrin ......................... 264/40.1 |
| 2004/0093114 A1 * | 5/2004 | Magario et al. ................ 700/197 |

(Continued)

FOREIGN PATENT DOCUMENTS

DE   43 01 130 A1   7/1993

(Continued)

OTHER PUBLICATIONS

"Selogica—the control unit for all ALLROUNDER injection moulding machines", May 1, 2002, pp. 1-31, XP002305034, p. 9-14.

(Continued)

*Primary Examiner* — Kidest Bahta
(74) *Attorney, Agent, or Firm* — Henry M. Feiereisen; Ursula B. Day

(57) ABSTRACT

Disclosed is a method for programming the progress of an injection molding cycle of an injection molding machine. The injection molding cycle includes several sequences which are manually started as a whole or in part in a setup mode and in a teaching mode. In the setup mode, parts of the injection molding machine are first actuated and are tested as to the functionality thereof. The tested parts are then actuated once again in the teaching mode according to the desired sequence of movements, said sequence of movements being stored in a controller of the injection molding machine. Specific actions such as building up and reducing forces and generating holding pressure can also be taught. The individually taught sequences can then be freely combined into new processes in a controller having a suitable operator interface and can be repeated multiple times.

15 Claims, 4 Drawing Sheets

U.S. PATENT DOCUMENTS

2004/0139810 A1* 7/2004 Saito et al. .................. 73/865.9
2005/0161847 A1* 7/2005 Weatherall et al. .......... 264/40.1

FOREIGN PATENT DOCUMENTS

| | | |
|---|---|---|
| DE | 199 00 117 A1 | 7/2000 |
| DE | 102 46 925 A1 | 4/2003 |
| DE | 103 34 153 A1 | 2/2005 |
| DE | 10 2005 023 919 | 11/2006 |
| EP | 0 573 912 A | 12/1993 |
| EP | 0 792 726 B1 | 6/1999 |
| EP | 1 048 995 A2 | 11/2000 |
| JP | 61 102227 | 5/1986 |
| WO | WO 2005/009719 | 2/2005 |

OTHER PUBLICATIONS

"Technischer Neuansatz bei der Maschinensteuerung", Carl Hanser Verlag, Munich, Kunststoffe Aug. 2003, pp. 46-49.

* cited by examiner

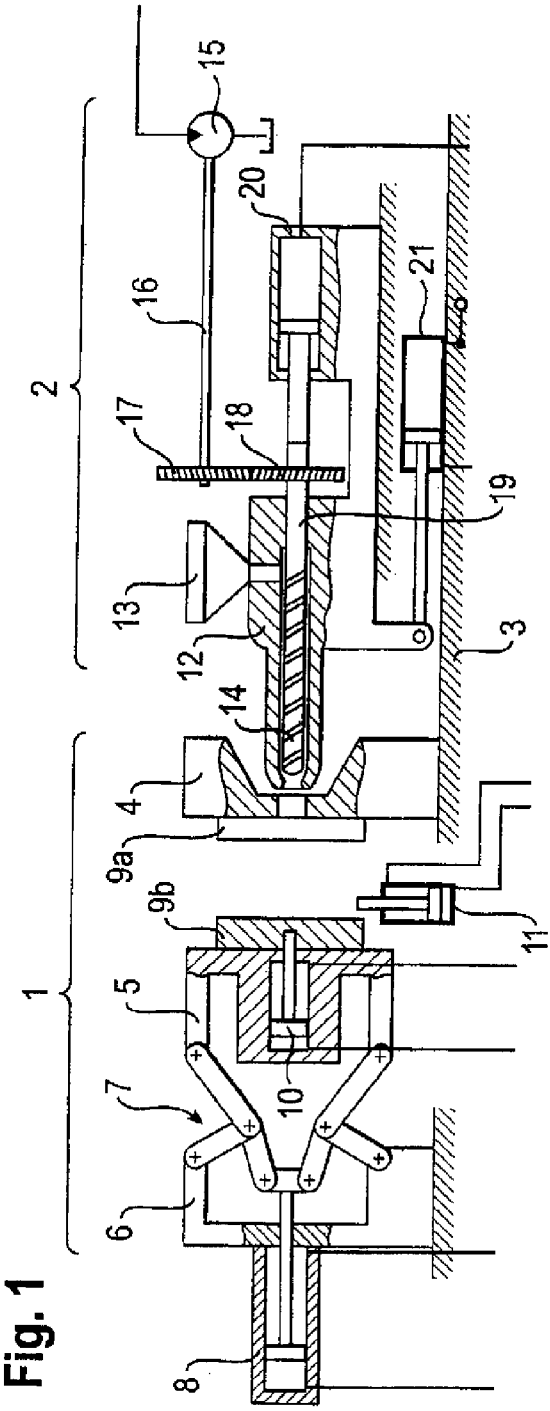
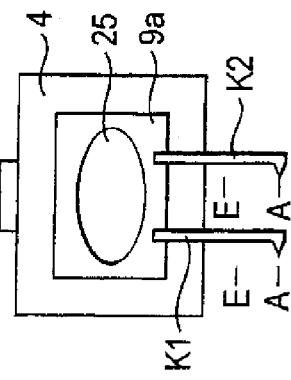
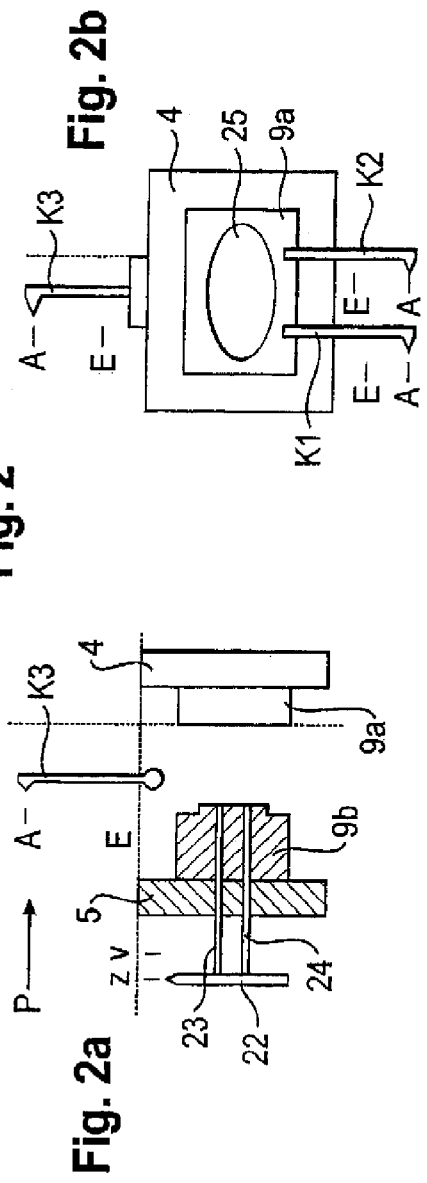
Fig. 1
Fig. 2
Fig. 2a
Fig. 2b (a) Starting situation (b) Sequence flow after editing

METHOD FOR SEQUENCE PROGRAMMING OF AN INJECTION MOLDING CYCLE OF AN INJECTION MOLDING MACHINE

CROSS-REFERENCES TO RELATED APPLICATIONS

This application is a continuation of prior filed copending PCT International application no. PCT/EP2007/062230, filed Nov. 12, 2007, which designated the United States and has been published as International Publication No. WO 2008/061910 on which priority is claimed under 35 U.S.C. §120 and which claims the priority of German Patent Application, Serial No. 10 2006 055 330.6, filed Nov. 23, 2006, pursuant to 35 U.S.C. 119(a)-(d).

BACKGROUND OF THE INVENTION

The invention relates to a method for sequence programming of an injection molding cycle of an injection molding machine.

It is known in the art to program an injection molding cycle, i.e., the operation of an injection molding machine, with a user-definable controller (SPS) located on the injection molding machine itself (online) or remote from the injection molding machine at a separate terminal (off-line). During online programming, the injection molding machine is not available for the production for a considerable length of time. Conversely, during off-line programming, the injection molding machine typically needs to be stopped only for a short time to make final fine-adjustments in the program.

Such user-definable controllers typically include data processing program for setup and operation of an injection molding machine. Each manufacturer of an injection molding machine typically offers a user-definable control customized for the (proprietary) machine program. However, in these controllers the process flow of an injection molding cycle cannot be changed or only with the help of the machine manufacturer. The user or processor cannot program the controller.

Modifications are user-definable sequence controllers, wherein the user or processor is provided in the controller with tools which can be configured to assemble the process flow of an injection molding cycle from predefined elements (macros). Such stored program process controllers are described in the publication "Kunststoffe" (Plastics), Vol. 08/2003, pages 46-49.

The processor using injection molding machines from different manufacturers must have experience with different user-definable sequence controllers in order to be able to correctly program all process flows and movements required for the manufacture of a certain product.

Already a user-definable sequence controllers from a single manufacturer is not easy to master; and if a person is not constantly involved with the program and if a new process needs to be programmed only after a considerable time (for example, because a different product is to be manufactured), then the person must first familiarize himself with this program, which is quite time-consuming. The situation becomes more difficult, when injection molding machines from different manufacturers must be programmed and hence different user-definable sequence controllers must be mastered.

Flow diagrams supplied by mold manufacturers help somewhat when programming a process flow of an injection molding machine. Such flow diagrams described and illustrated in detail when which part of a mold needs to perform which type of movement, so that at the end the molded part is correctly produced and can be flawlessly removed from the mold. However, these flow diagrams must still be entered into the user-definable sequence controller (SPS) or converted to the "correct" program sequence, which requires a certain knowledge concerning these controllers. Moreover, such flow diagrams are not available for each mold. In addition, errors may occur when information about positions, such as "advanced" and "retracted", or "moved in" and "move out" are not unambiguous. It has to be taken into account that the operating personnel frequently does not have technical knowledge about injection molding machine and molds.

The fundamental problem with all user-definable controllers (SPS) and the aforedescribed user-definable sequence controllers is that the entire injection molding cycle is initially entered in the controller and thereafter executed in its entirety, without being able to risk-free test the cycle or sections of the cycle. Errors have the potential to severely damage the molds.

To simplify programming of machines, so-called "teach-in systems" are known. These are auxiliary tools designed to facilitate programming of complex machines which typically do not require programming experience or knowledge about the machine control. DE 199 00 117 A1 discloses a teach-in system for programming grinding machines or other machine tools. This teach-in system includes a graphic user interface for visualization of blanks, workpieces and tools. The illustrated elements can be placed in any relation with one another by moving corresponding control elements. The resulting movements are recorded by the teach-in module and translated into a machine control program; alternatively, an existing machine control program is altered by the movements. This system represents a so-called virtual teach-in system.

Other teach-in methods and teach-in systems are known from programmable industrial robots, for example to teach the controller of the robot the movement of a manipulator arm relative to a workpiece (teaching the robot). The desired movement of the robot is manually entered into an input device, either numerically or graphically. A data processing program converts these input values into a "movement program" for the industrial robot, i.e., the motion sequence is programmed automatically. Teach-in systems for industrial robots are disclosed, for example, in EP 0 792 726 B1 and U.S. Pat. No. 4,224,501. EP 1 048 995 A2 also discloses a virtual teach-in system for a robot for removing injection-molded parts from the mold of an injection molding machine.

U.S. Pat. No. 4,696,632 discloses a teach-in method for an injection molding machine, wherein a movable mold half is moved from a closed position to an open position; positions are taught where the movable mold half is accelerated or decelerated depending on the direction of travel, so that the desired end position is reached correctly.

SUMMARY OF THE INVENTION

Based on this premise, it is an object of the invention to provide a method for simplifying sequence programming of a complete injection molding cycle of an injection molding machine, which can be used independently of manufacturer-specific programs and hence universally with any type of injection molding machine.

The object is attained with a method for sequence programming an injection molding cycle of an injection molding machine having one or more sequences, wherein the sequences of the injection molding cycle are manually executed in a setup mode, either entirely or partially, and are manually executed in a teach-in mode, either entirely or partially, wherein parts of the injection molding machine are operated and tested for their functionality initially in the setup mode, and wherein the tested parts are thereafter operated in the teach-in mode according to the desired motion sequence, wherein this motion sequence is stored in a controller of the injection molding machine.

By performing the sequences of the injection molding cycle initially manually in a setup mode and checking their functionality, and by subsequently operating the checked parts again in the teach-in mode according to the desired motion sequence, wherein the motion sequence is stored in a controller of the injection molding machine, malfunctions can be identified and remedied already before teach-in. The operator also sees where the parts of the injection molding machine are moved so that it becomes inconsequential how certain directions or positions are labeled. For example, it is inconsequential what "core moved in" or "core moved out" means. This prevents errors of the kind that can occur in controllers which are manually programmed by a user, when terms like "moved in" and "moved out" are misinterpreted and the entire motion sequence is executed in one pass at the end of the complete programming process. In addition, an operator can realize even complex process sequences without detailed knowledge of the controller; only the motion sequence of the parts of the injection molding machine must be known. Because the forces during movement of the parts of the injection molding machine are drastically reduced in the setup mode and the teach-in mode, potential errors may cause no damage at all or only insignificant damage.

Advantageously, the actions to be performed by the injection molding machine, for example building-up or decreasing the mold closing force, or generating dwell pressure with the screw, can be taught in the teach-in mode when teaching the motion sequence. Likewise, start conditions for triggering additional or auxiliary functions can be set in the teach-in mode. For example, it can be taught that the injection unit should advance and dock on the fixed mold half only during the first cycle.

The positions attained in the teach-in mode by the parts of the injection molding machine, for example by the movable mold half or the plasticizing screw, can be entered manually into a control unit. However, they can also be identified automatically, for example with position sensors, and then automatically taught at the same time.

Optionally, representative physical quantities of actions to be performed by parts of the injection molding machine can be displayed during teaching of the action on a display screen. Optionally, desired and tolerance values can be displayed on the display screen together with these physical quantities. An operator can then observe on the display screen if the quantities remain inside the predefined tolerance values during this action. For example, the curve of the closing pressure or the closing force F as a function of time t an be displayed.

After teach-in is concluded, the motion sequence can be optimized by having the operator perform the injection molding cycle once automatically and then change the parameters to be optimized. For example, an ejector or a core puller may be made to move faster by increasing the quantity of oil in hydraulic injection molding machines accordingly.

BRIEF DESCRIPTION OF THE DRAWING

The invention will now be described in detail with reference to an exemplary embodiment in conjunction with FIGS. 1 to 5 which show in FIG. 1 schematically a hydraulically operated injection molding machine;

FIG. 2a a schematic illustration of an injection molding tool, showing in detail a longitudinal cross-section through a clamping unit of the injection molding machine;

FIG. 2b a top view upon a fixed mold half 9a of the injection molding machine;

DETAILED DESCRIPTION OF PREFERRED EMBODIMENTS

Figure 3:
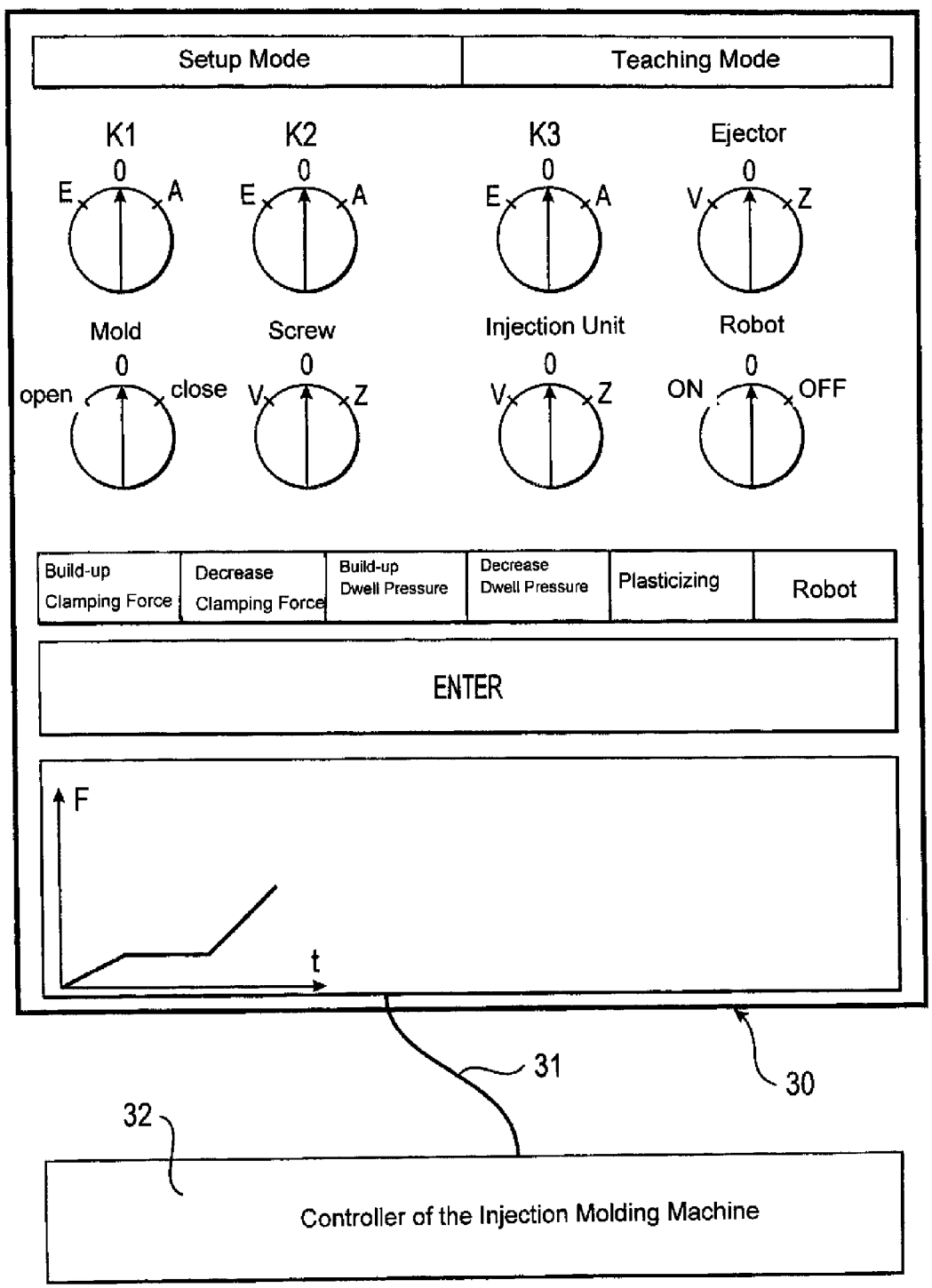
FIG. 3 a schematic illustration of a control system for performing the injection molding cycle in a setup mode and a teach-in mode.

FIG. 1 shows schematically a conventional hydraulically operated injection molding machine with a clamping unit 1 and an injection unit 2 which are supported on a machine bed 3. The clamping unit 1 includes a fixed platen 4 with a fixed mold half 9a, a movable platen 5 with a movable mold half 9b, a support platen 6, a toggle lever mechanism 7 and a hydraulic cylinder 8 (clamping cylinder) for operating the toggle lever mechanism. The movable platen 5 can be moved with the hydraulic cylinder 8 which also produces the required clamping pressure. Alternatively, separate hydraulic cylinders can be used for moving the movable platen and producing the required clamping pressure. In addition, a hydraulic cylinder 10 for operating an ejector and one or more hydraulic cylinders 11 for operating core pullers are provided. The injection unit 2 includes essentially a plasticizing cylinder 12 with a feed funnel 13 for supplying granular plastic material as well as a rotatably and linearly driven plasticizing screw 14. A hydraulic motor 15 is employed as a rotary drive, with the rotary motion transferred to the driveshaft 19 of the plasticizing screw 14 via a shaft 16 and toothed gears 17, 18. The linear drive is implemented as a hydraulic cylinder 20 (injection cylinder) which is coupled with the driveshaft 19. The entire injection unit 2 on the machine bed 3 can be moved with an additional hydraulic cylinder 21 (closing cylinder). Not illustrated is a conventional robot for removing the injection-molded parts.

FIG. 2 shows schematically an embodiment of an injection molding tool with an ejector with two ejector rods and three core pullers. The fixed mold half 9a is attached to the fixed platen 4, while the movable mold half 9b is attached to the movable platen 5. An ejector plate 22 with to ejector rods 23 and 24, which can be moved between a retracted position z and an extended position v is arranged on the movable platen 5. in addition, three core pullers K1, K2 and K3 are provided which can be moved at different times into and out of a cavity 25 or between the mold halves 9a and 9b. The extended position is here labeled with A and the retracted position with E. In the illustrated example, a cavity 25 is formed in the fixed mold half 9a of the injection molding tool 9. The illustration on the left side of FIG. 2a corresponds to a longitudinal cross-section through the clamping unit of the injection molding machine, whereas the illustration on the right according to FIG. 2b corresponds to a top view on the fixed mold half 9a from the direction of arrow P.

FIG. 3 shows a control unit 30 for performing the injection molding cycle in the setup mode and in the teach-in mode. The control unit is connected by a line 31 with the controller 32 of the injection molding machine; alternatively, wireless data transmission from the separate control unit 30 to the controller 32 of the injection molding machine is also possible. The control unit has three switches for operating the cores K1, K2 and K3, a switch for opening and closing the mold halves, switches for moving the ejector plate 22, the plasticizing screw 14 and the entire injection unit 2 back and forth. The attained positions can be acknowledged and stored by pressing an "ENTER" key. In addition, key switches or control interfaces for performing and teaching actions are provided. In the present example, these key switches or control interfaces are used to increase and decrease the clamping force, increase and decrease the dwell pressure, plasticize (rotate the plasticizing screw), select of the robot. The control unit also has a display screen on which certain actions can be displayed, for example a curve of the clamping force F as a function of time t. Instead of using a separate operator terminal, the process sequence can also be programmed on the controller 32 itself.

Figure 4:
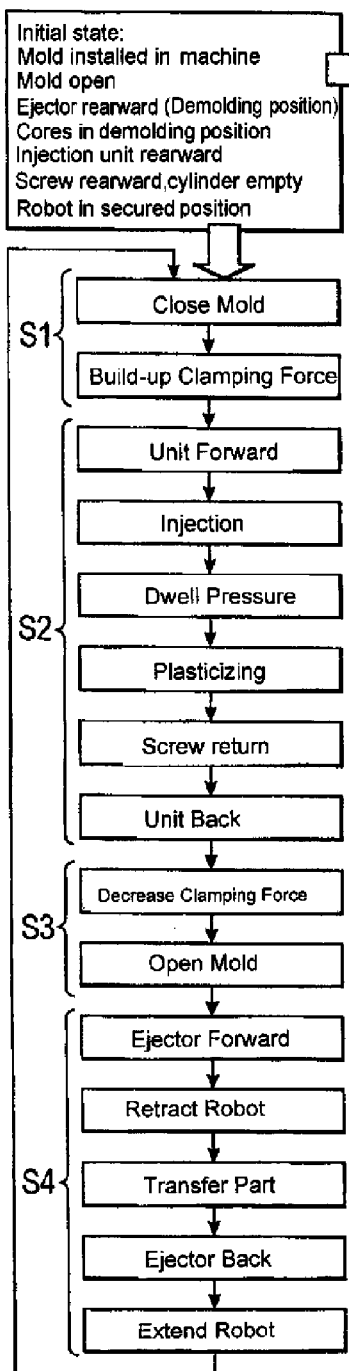
FIG. 4 a sequence programming of the injection molding machine.
Figure 4:
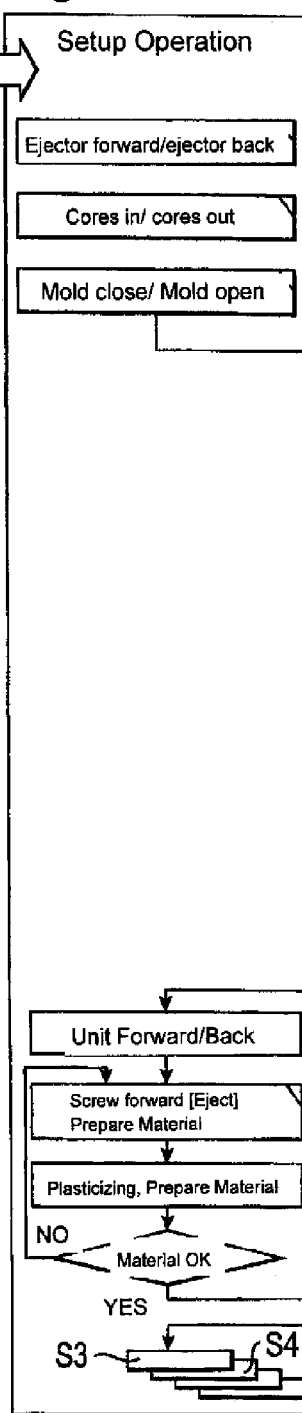
Figure 4:
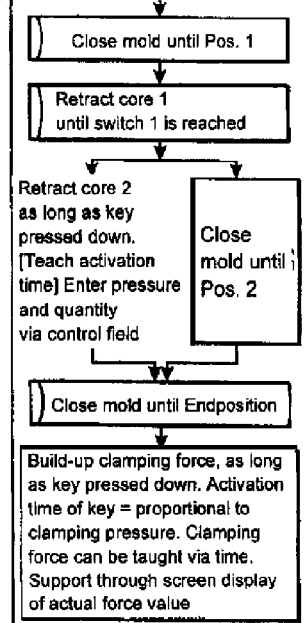
Figure 4:
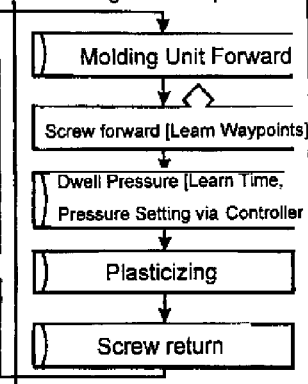

Reference is now made to FIG. 4 which describes sequence programming of the injection molding machine. The left column (column 1=FIG. 4a) illustrates the steps to be performed in an injection molding cycle, wherein several steps form sequences S1 to S4. The center column (column 2=FIG. 4b) illustrates those sequences or steps which are performed manually in the setup mode of the injection molding machine. The right column (column 3=FIG. 4c) illustrates those sequences or steps which are performed manually in the teach-in mode of the injection molding machine. The definition of the symbols used in the flow diagrams of FIGS. 4b and 4c are explained in the box of FIG. 4d.

The following situation forms the basis for the process. The injection molding tool is mounted in the injection molding machine, i.e., the mold halves 9a, 9b are mounted on the platens 4 and 9. The clamping unit 1 is open. The ejector plate 22 and the cores K1, K2 and K3 are all in their respective rearward position, i.e., the ejector plate 22 is in the retracted position z while the cores are in the extended positions A. The injection unit 2 is also in a retracted position, where the injection nozzle is raised from the fixed mold half by a certain distance. The plasticizing screw, hereinafter also referred to simply as screw, is in a rearward position, i.e., the injection cylinder 20 is empty. The robot is in a safety position outside the clamping unit. These positions or states are stored as initial positions in the controller of the injection molding machine.

Starting from this situation, the setup mode of the injection molding machine is initially selected on the control unit 30 by pressing on the labeled control interface. In the setup mode, initially the functionality of the ejector, the cores and the clamping unit is checked. To this end, the ejector plate 22 is first moved back and forth several times between the positions z and v by switching the corresponding switch back and forth. In the same way, the cores K1, K2 and K3 are moved back and forth several times between the positions A and E by switching the corresponding switches. Thereafter, the movable platen is opened and closed once, optionally several times, by switching the corresponding switch back and forth. This is done to control the direction of movement and end position signals (limit switches). When the moved parts function properly, the system is switched into the teach-in mode by pressing the correspondingly labeled control interface of the control unit 30.

Teaching of the first sequence of the first sequence S1 of the injection molding cycle can now begin. The switch for the movable mold half is rotated from the "stop" position into the "advance" position, causing hydraulic fluid to be supplied to the hydraulic cylinder 8. As a result, the movable platen together with the movable mold half is advanced toward the fixed mold half 9a. When a predetermined position P1 is reached, this position P1 is read into the controller of the injection molding machine by pressing the ENTER-key. At this position P1, a core K1 is to be retracted until reaching an end position. To this end, the switch K1 associated with the core K1 is rotated into the E-position, thereby operating the associated hydraulic cylinder. The core K1 is now retracted, with the end position of the retraction being recognized by the end position switch and automatically stored in the controller. The core function can be taught separately (without moving the mold half) as well as parallel to the mold half (core and closing key are actuated simultaneously). Alternatively, when reaching the retracted position, the ENTER-key can be pressed, and this position of the core K1 can be taught manually. The movable platen is then moved farther forward until reaching a position P2 which is read into the controller by pressing the ENTER-key. In parallel, a core K2 is retracted by rotating the switch K2 into the position E. The distance traveled by the core K2 can be identified, as described above, by a limit switch and taught automatically. Teach-in can also be done by measuring the time for controlling the core K1, i.e., as long as a switch is maintained in position E, the corresponding hydraulic cylinder is supplied with a certain quantity of oil under a certain pressure, wherein the quantity of oil and the pressure can be entered via a keyboard, optionally before programming of the process begins. The movable platen is then advanced farther forward, until the mold halves 9a and 9b are closed, i.e., until there are in the separation plane, with the platens touching one another. This position P3 is also read into the controller by pressing the ENTER-key. In this position P3, the action "build up clamping force" is also taught. This can be done by pressing the corresponding control interface on the control unit until the clamping force attains a desired value. The clamping force can then be displayed as a function of time on a display screen on the control unit or on the controller. In addition to the curve of the actual value, desired values and/or tolerance values can be indicated on the display screen with the same scale. In this way, the operator can confirm if the process operates within the preset limits. When the desired clamping force has been reached, the control interface "build up clamping force" is no longer pressed, concluding teach-in of this action. With this last step, teaching of the first sequence S1 of the injection molding cycle is concluded.

Before the second sequence S2 is taught, the process changes from the teach-in mode into the setup mode (FIG. 4b). By operating the switch for the injection unit, hydraulic fluid is applied to the hydraulic cylinder 21 and depending on the switch position, the injection unit can be moved towards or away from the fixed mold half 9a. This process can be performed once or several times. When the injection unit is again in a rearward position, hydraulic fluid is applied to the injection cylinder 20 by operating the corresponding switch and the screw is moved forward, thereby expelling any already molten plastic material. Thereafter, the hydraulic motor 15 is operated and the screw is rotated. The granular plastic material is then pulled in a conventional manner, melted and transported into the space before the screw, whereby the screw is simultaneously moved rearward. When sufficient molten plastic material is collected in the space in front of the screw, the injection cylinder 20 is again operated, whereby the screw is moved forward and the melt is expelled. The expelled material is tested. If the test result does not agree with the expectations (material OK=NO), then the steps "plasticizing, prepare material, advance screw, eject material" are repeated as often as necessary, until the material conforms to the specification (material OK=YES).

If the result is "material OK=YES", then the second sequence S2 of the injection molding cycle can be taught, which applies to the injection unit 2. By activating the control interface "teach-in mode" on the control unit 30, the process switches from the setup mode into the teach-in mode. In a first step of the sequence S2, the forward motion of the injection unit 2 is taught. The corresponding switch is hereby rotated into the position "forward" and the hydraulic cylinder 21 is operated, i.e., the injection unit is moved forward. As soon as the injection nozzle docks at the mold half 9a and a predetermined nozzle contact force has been attained, the attained position and the attained pressure in the hydraulic cylinder 21 are stored in the controller. The position can be entered by pressing the ENTER-key; the attained pressure can optionally be stored automatically in the controller. At the same time, the start condition is set such that the injection unit 2 can advance only during the first injection molding cycle. The advance movement of the screw is taught as the next step. Depending on the desired dependence of the injection pressure, different positions of the screw can be taught in a similar manner as the positions of the movable mold half were taught. When the most forward position of the screw has been taught, the action "generate dwell pressure" to be performed at that position can be taught and associated with this position. A time duration during which the dwell pressure is maintained can also be taught. The magnitude of the dwell pressure can be directly entered on the controller or can be present at the start. After the dwell pressure phase has ended, the plasticizing process must be started and the screw moved back. This time is taught as the end of the time for the dwell pressure and is used, on one hand, for starting the hydraulic motor 15 and, on the other hand, for controlled retraction of the injection cylinder 20. After retraction of the screw is taught, the complete sequence S2 of the injection molding cycle is executed once in teach-in mode and the corresponding movements and actions are taught and stored in the controller.

In an analogous manner, the sequences S3 and S4 are also executed, to the extent required, initially manually in setup mode and thereafter in teach-in mode, after functional testing is completed.

At the end of programming the process, all sequences S1 to S4 are taught, i.e., programming of the process of the complete injection molding cycle is completed.

Figure 5:
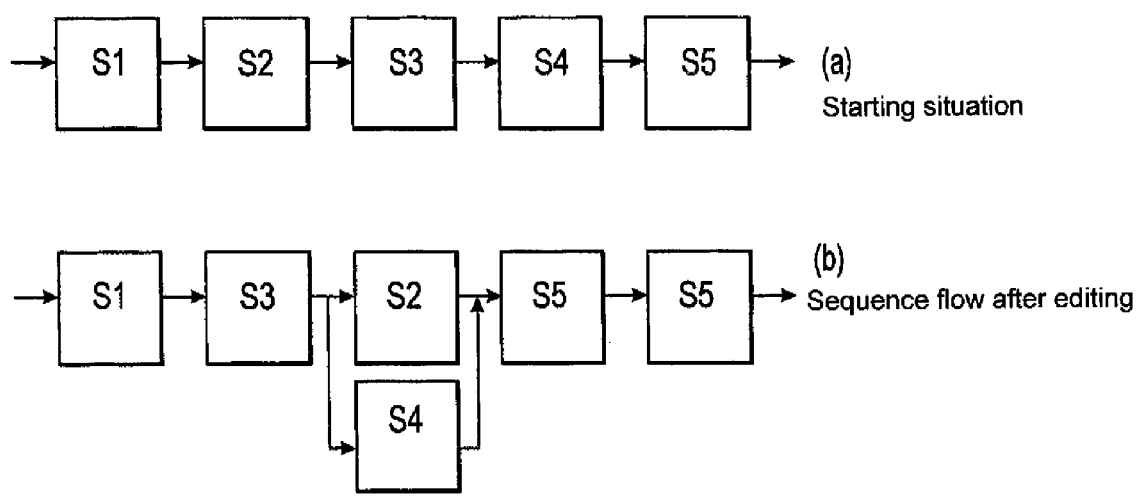
FIG. 5 a schematic illustration of a combination of individually taught sequences in a suitable editor.

It is also possible to newly combine the individually taught sequences in a suitable editor, meaning that the order and possible repetition of functions can be freely selected. This will now be described with reference to FIG. 5. The sequences S1 to S5 are initially taught in a manner according to the invention. Thereafter, the taught sequences can be assembled in any order depending on the application. Sequences can also be repeated. A possible example is the ejector rocking stroke. The back and forth motion of the ejector is only taught once and stored, for example, as sequence S5, which is then sequentially inserted in the editor several times.

In both the setup mode and the teach-in mode, the parts of the injection molding machine can be selectively operated with reduced forces (in hydraulic injection molding machine also with reduced hydraulic pressures) or with the actual process values (high pressures and velocities).

It should also be mentioned that the process parameters, such as travel speed, wait times (e.g., cool-down time), monitoring times, pressures and the like can be entered into the machine controller during teach-in of the process sequence, either directly or in response to a request. Auxiliary programs can also be provided to make it easier for an operator to optimize the process sequence.

What is claimed is:

1. A method for sequence programming an injection molding cycle of an injection molding machine having a plurality of sequences, comprising the steps of:

manually separately executing individual sequences of the injection molding cycle in a setup mode, said setup mode operating and testing functionality of parts of the injection molding machine with an individual sequence to identify and remedy malfunctions of the individual sequence;

manually executing the sequences in a teach-in mode after malfunctions of the individual sequence are identified and remedied, said teach-in mode operating the tested parts according to a desired motion sequence and generating a motion sequence based on operative results obtained in the teach-in mode; and storing the generated motion sequence in a controller of the injection molding machine for subsequently operating the injection molding machine with the generated motion sequence.

2. The method of claim 1, wherein the generated motion sequence includes actions to be performed by the injection molding machine.

3. The method of claim 2, wherein the actions to be performed include defining a built-up and a decrease of the clamping force.

4. The method of claim 1, wherein the generated motion sequence includes start conditions for triggering additional or auxiliary functions of the injection molding machine.

5. The method of claim 1, wherein testing functionality of parts of the injection molding machine in the setup mode includes checking the functionality of parts of the clamping unit, and wherein the generated motion sequence for the parts of the clamping unit is taught in the teach-in mode.

6. The method of claim 1, wherein testing functionality of parts of the injection molding machine in the setup mode includes checking the functionality of parts of an injection unit, and wherein the generated motion sequence for the parts of the injection unit is taught in the teach-in mode.

7. The method of claim 6, wherein testing functionality of parts of the injection molding machine in the setup mode includes transferring plastic melt out from the injection unit and testing the transferred plastic melt, and wherein a change from the setup mode into the teach-in mode is made only when the transferred plastic melt satisfies predetermined criteria.

8. The method of claim 1, further including identifying positions attained in the teach-in mode and storing the identified positions in the controller.

9. The method of claim 1, further comprising the step of entering in the teach-in mode activation times for parts of the injection molding machine in the controller.

10. The method of claim 2, wherein the actions define physical quantities and the physical quantities representative for the actions are displayed on a display screen during teach-in of the actions.

11. The method of claim 10, further comprising the step of displaying desired values and tolerance values for the physical quantities on the display screen.

12. The method of claim 1, further comprising storing a motion sequence corresponding to the individual sequence in the controller.

13. The method of claim 1, further comprising the steps of including a peripheral device in the injection molding cycle; manually operating elements of the peripheral device in the setup mode and in the teach-in mode, and storing a motion sequence of the peripheral devices in the controller.

14. The method of claim 13, wherein the peripheral device is a robot.

15. The method of claim 1, further comprising the steps of:
selecting subsequences or individual motion steps from the generated motion sequence;
combining or repeating, or both, the subsequences or individual motion steps to form complex functional motion curves.

* * * * *